(12) United States Patent
Overes et al.

(10) Patent No.: US 9,488,863 B2
(45) Date of Patent: Nov. 8, 2016

(54) LIGHTING DEVICE

(71) Applicant: TP VISION HOLDING B.V., Amsterdam (NL)

(72) Inventors: Theodorus Franciscus Emilius Overes, Eindhoven (NL); Hugo Johan Cornelissen, Waalre (NL); Gabriel Eugen Onac, Veldhoven (NL); Erno Hermanus Antonius Langendijk, Eindhoven (NL)

(73) Assignee: TP VISION HOLDING B.V., Eindhoven (NL)

( * ) Notice: Subject to any disclaimer, the term of this patent is extended or adjusted under 35 U.S.C. 154(b) by 221 days.

(21) Appl. No.: 14/377,721

(22) PCT Filed: Feb. 11, 2013

(86) PCT No.: PCT/EP2013/052671
§ 371 (c)(1),
(2) Date: Aug. 8, 2014

(87) PCT Pub. No.: WO2013/117755
PCT Pub. Date: Aug. 15, 2013

(65) Prior Publication Data
US 2015/0355505 A1 Dec. 10, 2015

Related U.S. Application Data

(60) Provisional application No. 61/597,218, filed on Feb. 10, 2012.

(51) Int. Cl.
*G02F 1/1335* (2006.01)
*F21V 8/00* (2006.01)

(52) U.S. Cl.
CPC ....... *G02F 1/133603* (2013.01); *G02B 6/0043* (2013.01); *G02B 6/0073* (2013.01); *G02B 6/0075* (2013.01); *G02F 1/133606* (2013.01); *G02F 1/133611* (2013.01)

(58) Field of Classification Search
None
See application file for complete search history.

(56) References Cited

U.S. PATENT DOCUMENTS

2011/0305004 A1   12/2011   Kim et al.

FOREIGN PATENT DOCUMENTS

EP   2381302 A1   10/2011

OTHER PUBLICATIONS

International Search Report in PCT/EP2013/052671 dated Mar. 28, 2013.

*Primary Examiner* — Richard Kim
(74) *Attorney, Agent, or Firm* — Michael Best & Friedrich LLP

(57) ABSTRACT

The present disclosure relates to a backlight for illuminating back lit displays (e.g. LC displays of LCD televisions). In order to enable a thin design of the backlight and a high uniformity of the light emitted by the backlight, an apparatus may be provided with transparent and diffusing masking elements that may mask individual light sources and may diffuse light back into a light guide. Absorbing elements and/or retro-reflective elements may be arranged proximate the light sources in order to avoid generation of bright spots or rings around the light sources.

19 Claims, 2 Drawing Sheets

LIGHTING DEVICE

TECHNICAL FIELD

The present disclosure relates to a lighting device. More particularly, the present disclosure relates to light devices for pixelated displays such as for liquid crystal displays.

BACKGROUND

LCD televisions which, may be very thin, are attractive among consumers. Accordingly, there is a desire to make televisions as thin as possible. Generally, an LCD television comprises a LC display, which is illuminated by a backlight. Accordingly, a thickness of an LCD television may be reduced by reducing the thickness of the backlight. However, reducing the thickness of the LCD backlight may negatively affect the capability of the backlight to illuminate the LC display with a uniform light intensity.

To improve the contrast of the displayed picture and to reduce the power consumption of the display backlights, individually controlled segments within a backlight are preferred. By dimming the brightness of a segment of the backlight, the black level of the dimmed part of the displayed picture can be improved, and the power consumption will reduce. Backlights capable of controlling segments individually are generally thicker than backlights without this capability To limit the increase of the thickness, such backlights generally use a high number of small LED's, resulting in high cost. To reduce the thickness further, light guide concepts may be applied which use expensive materials and which are hard to produce.

Accordingly, there is a need for improving such backlights for LCD televisions and for other pixel based displays.

SUMMARY

In general, the present disclosure seeks to mitigate, alleviate or eliminate one or more of the above mentioned disadvantages relating to thickness singly or in any combination. In particular, the present disclosure provides a lighting device that may solve at least some of the above mentioned problems, or other problems, of the prior art.

A lighting device is provided that includes a planar light guide with a back face for receiving light and a front face for emitting light, a light source arranged to transmit light into the back face of the light guide, a semi-transparent masking element having a light diffusing surface arranged to partially diffuse light back into the light guide and partially transmit light through the masking element so as to mask the light source, and a light absorber arranged adjacent to the light source to absorb at least a fraction of light diffused from the diffusing surface of the masking element, or a retro-reflector arranged adjacent to the light source to reflect at least a fraction of light diffused from the diffusing surface of the masking element back to the adjacent masking element.

Some of the light which is partially diffused back into the light guide by the diffusing surface of the semi-transparent hits an area surrounding the light source and propagate trough this area. When a reflecting or diffusing surface (e.g. an associated printed circuit board or diffuse reflector for re-using light) is arranged behind the back face, the light which is transmitted through this area will illuminate the reflecting or diffusing surface. This illumination may be visible from the front side as a bright illuminated area such as a bright ring surrounding the light source. By arranging a light absorber, alternatively a retro-reflector, as defined, the brightness of the undesired bright ring can be controlled or eliminated. Thus, the combination of a light source, a semi-transparent masking element, and light absorbers may advantageously provide a lighting device capable of emitting light so that a bright ring around the light source is avoided.

The lighting device may be used as a backlight for displays, however, in the configuration with only one light source or possibly a few light sources, such as between 2 and 20 light sources, the lighting device may be particularly advantageous as a general lighting source.

A lighting device includes a planar light guide with a back face for receiving light and a front face for emitting light, first and second light sources arranged to transmit light into the back face of the light guide, first and second semi-transparent masking elements having light diffusing surfaces, where the masking elements are arranged to partially diffuse light back into the light guide and partially transmit light through the masking elements so as to mask the respective first and second light sources, and first and second absorbers arranged adjacent to the respective first and second light sources to absorb at least a fraction of light diffused from the diffusing surfaces of the respective first and second masking elements, or first and second retro-reflectors arranged adjacent to the respective first and second light sources to reflect at least a fraction of light diffused from the diffusing surfaces of the respective first and second masking elements back to the respective first and second masking elements.

The lighting device which has a larger number of light sources, e.g. more than 20 light sources, or more than 200 or 2000 light sources may be used as a back light for displays, e.g. television or computer displays. The lighting device could also be used as a lighting source. Particularly, the lighting device could be configured with individually controllable light sources so as to provide a light emitting module on which patterns can be shown. Thus, by adjusting the intensity of the individual light sources or switching on or off the individual light sources various light patterns can be formed on or via the front face of the light guide.

In another embodiment, a lighting device is particularly suited as a back light for displays since the configuration of the lighting device may enable use of relatively thin lighting devices which as still capable of generating a uniform intensity distribution over the area of the light guide. The light sources of the lighting device may be individually dimmable for improving contrast of the display and for reducing energy consumption.

Alternatively the first or second light sources are optically connected to the back face. The optical connection may be achieved by an interface layer between the light source(s) and the back face, such as an interface layer of transparent adhesive. The optical connection could also be achieved by pushing a soft top surface of the light sources against the back face, when the light sources has such a soft top surface, such as a soft silicon surface. The use of an interface layer may advantageously improve in-coupling of light when the refractive index of the interface is selected according to particular criteria.

A lighting device may further include out coupling features arranged at the surface of the front face, or the surface of the back face of the light guide, or inside the light guide for coupling light out through the front face at non-masked locations where the masking element is not present. The out coupling features may further improve distribution of light within the light guide so as to provide a lighting device capable of emitting light with a uniform intensity distribution over the area of the plane light guide.

A light source may be mechanically connected to the light absorber, alternatively the retro-reflector, and the absorber alternatively the retro-reflector and/or the light source is fixed to the back face.

First and second light sources may be mechanically connected to the respective first and second light absorbers alternatively the retro-reflectors and the absorbers, alternatively the retro-reflectors, and/or the light sources are fixed to the back face.

A light absorber may provide a convenient way for fixing the light sources to the back of the light guide. The fixation of the light source may further be improved where the light sources are fixed to the back face by a transparent adhesive.

Where each of the absorber, alternatively the retro-reflector, and the light source is fixed to the back face by a transparent adhesive, the refractive index of the adhesive for the light source is greater than the refractive index of the adhesive for the absorber.

Where the absorbers, alternatively the retro-reflectors, and the light sources are fixed to the back face by a transparent adhesive, the refractive index of the adhesive for the light sources is greater than the refractive index of the adhesive for the absorbers. A transparent adhesive may additionally improve in-coupling of light from the light sources when the refractive index of the adhesive is selected according to particular criteria.

A lighting device may further include a light diffusing or reflective surface facing the back face of the light guide which is arranged next to the light absorber, alternatively the retro-reflector, for diffusing or reflecting light transmitted through the back face back into the light guide. The light diffusing or reflective surface may advantageously improve energy efficiency since light is reflected back into the light guide.

A light out coupling capability of the out coupling features and a transparency of the masking element(s) may be configured to equalize the light intensity of light coupled out by the out coupling features and the light transmitted by the masking element.

In a further embodiment, a display for showing images includes a matrix of image forming transparent pixels and a lighting device so that the front face of the lighting device faces a face of the matrix of image forming transparent pixels.

In yet a further embodiment, a method for illuminating a matrix of image forming transparent pixels of a display includes providing a lighting device having a planar light guide with a back face for receiving light and a front face for emitting light, first and second light sources arranged to transmit light into the back face of the light guide, first and second semi-transparent masking elements having light diffusing surfaces, where the masking elements are arranged to partially diffuse light back into the light guide and partially transmit light through the masking elements so as to mask the respective first and second light sources, and first and second absorbers arranged adjacent to the respective first and second light sources to absorb at least a fraction of light diffused from the diffusing surfaces of the respective first and second masking elements, or first and second retro-reflectors arranged adjacent to the respective first and second light sources to reflect at least a fraction of light diffused from the diffusing surfaces of the respective first and second masking elements back to the respective first and second masking elements. The method further includes arranging the matrix of image forming transparent pixels in front of the plate shaped light guide.

In summary, the present disclosure relates to a lighting device for use as a lighting source or for a backlight for illuminating a display (e.g. LC displays of LCD televisions). In order to enable a thin design of the backlight and a high uniformity of the light emitted by the backlight, a backlight is provided where transparent and diffusing masking elements masks the individual light sources and diffuses light back into the light guide. Absorbing elements or retro-reflective elements may be arranged so that they surround the light sources in order to avoid generation of bright spots or rings around the light sources.

In general the various aspects may be combined and coupled in any way possible within the scope of the present disclosure. These and other aspects, features and/or advantages of the backlight and associated displays will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
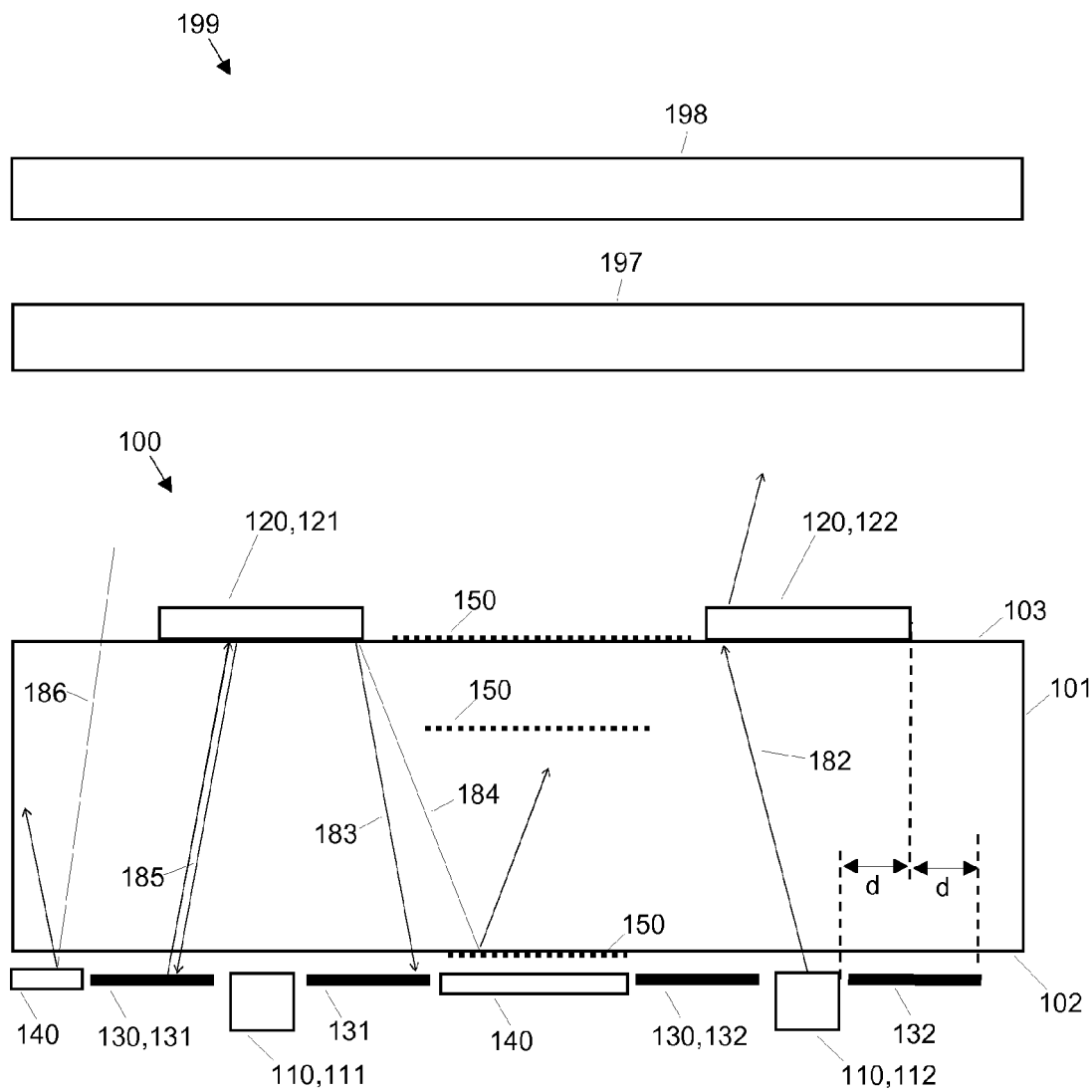
FIG. 1 shows a backlight 100 for a display 199.

FIG. 1 shows a display 199, such as a television or computer monitor, for showing images. The display 199 may include a matrix of image forming transparent pixels such as a liquid crystal display 198. The pixel matrix 198 may be configured to be illuminated by a lighting device 100 arranged so that the front face of the lighting device 100 faces a face of the pixel matrix 198. The light source 100 may be referred to as a back light. A diffuser plate 197 may be inserted between the pixel matrix 198 and the lighting device 100 for further diffusion of the light emitted by the light source 100. Generally, the diffuser plate may be combined with other optical foils like brightness enhancement foils. These foils and the diffuser foil or plate constitute an optical stack which may form part of the lighting device 100 for improving uniformity of the light.

An embodiment relates to the lighting device 100. The lighting device 100 may include a planar light guide 101, e.g. a plate shaped light guide 101 with a back face 102 for receiving light and a front face 103 for emitting light. The plate shaped light guide may be flat, i.e. have the same thickness throughout the plate. The light guide 101 may be made from glass or plastic material such as PMMA.

Light is injected into the light guide 101 by light sources 110 such as first and second light sources 111, 112 arranged to transmit light into the back face 102 of the light guide 101. The light sources may be light emitting diodes (LED) and may have a plane light emitting surface from which light is transmitted through. Rays, such as ray 182, which have angles (relative to the normal) which are not large enough to establish total internal reflection are substantially transmitted through the front face.

The size of the out-coupling area on the front face 103 where rays are refracted out through the light guide 101 can be determined by determining the offset d between the boundary of area where the light enters the back face 102, i.e. the in-coupling area, and the border of the out-coupling area (in case the light source is placed close to back face 102 the boundary of area where the light enters the back face corresponds to the edge of the light source 110):

$$d = t \times \tan(ca),$$

where t is the thickness of the light guide 101, ca is the critical angle for achieving total internal reflection=arcsin(n0/n1) where n0 is the refractive index of the material or air facing the back face 102, and n1 is the refractive index of the light guide material.

For example, with a light guide 101 of 1 mm thick PMMA (with n1=1.5), placed in air (with n0=1), d will be 0.9 mm. So a circular in-coupling area (area of light emitting surface of light source 110) with diameter of 1 mm will lead to a circular out-coupling area with diameter 1+2*0.9=2.8 mm.

It may be desirable to be able to block or at least partially block rays 182 within the out-coupling area so that transmittance of the rays towards the optical stack or diffuser plate 197 is prohibited or reduced, e.g. so that intensity of light transmitted out towards the optical stack or diffuser plate 197 is reduced. This can be achieved by locating masking elements 120 such as first and second masking elements 121,122 at the front side 103. Thus, the masking elements, which may be in optical contact with the light guide, may be configured to partially transmit light or rays.

In order to redirect at least some of the light intensity of the rays 182 back into the light guide 101 the masking element 122 could be configured with a reflective and diffusing surface so as to diffuse incident rays into different directions. Accordingly, at least part of the light intensity, i.e. light power, of the ray 182 is diffused by the diffusing property of the masking element 122 back into the light guide 101 where at least some of the diffused rays are totally internally reflected like ray 184. The diffusing surface may face and make optical contact with the front face 103, the diffusing surface may be located on a possible opposite surface of the masking element, or the diffusing surface may be embodied by diffusing features embedded into the masking element.

Thus, the capability of masking the light sources 110, by blocking or partially transmitting rays 182 and diffusing non-transmitted rays may be achieved by arranging diffusing surfaces of the first and second masking elements 121,122 so that they faces the front face 103 of the light guide 101 and masks the respective first and second light sources 111,112. Thereby, rays 182 can be partially diffused back into the light guide and partially transmitted through the masking elements.

The area of a diffusing element may be larger than the area of a light emitting surface of the light source according to the off-set d. It is understood that the reference to first and second light sources 111,112 and first and second masking elements 121,122 is only used to make it clear that generally a light source 110 may have an associated masking element 120 for masking light of this associated light source. Thus, individual masking elements 120 of at least a selection of the plurality masking elements may be arranged opposite to respective individual light sources 110 of at least a selection of the plurality of light sources 110. That is, masking elements 120 may be arranged at the front face 103 oppositely to the light sources 110 arranged at the back face 102.

Some of the rays diffused from the diffusing surfaces of the masking elements 120, such as ray 183, may leave the light guide at an area around the location of a light source 110. Other rays diffused from the diffusing surfaces of the masking elements 120, such as ray 184, may hit the back face 102 with an angle which is sufficiently large so that the rays are total internally reflected. The rays 183 which are transmitted through the back face 102 may illuminate a surface located opposite to the back face 102. This illuminated surface will be visible as a bright ring from the front face 103. The surface at the back side 102 may be the surface of a printed circuit board to which the light sources 110 are connected to or other surface. Particularly, the surface of a white diffuse reflector placed opposite to the back face 102 for re-using light that would otherwise leave the light guide 101 via the back face would generate an undesired visible bright ring or area around the light sources 110.

Such undesired bright areas around the light sources can be eliminated or reduced by placing light absorbers 130 at the back side which have light absorbing surfaces facing the back face 102. The light absorbing surfaces may completely or substantial completely absorb the diffused light from the masking elements 120 so that no bright rings or areas are created around the light sources 110. The light absorbing surfaces may absorb more than 90%, more than 95% or even more than 99% of the incoming diffused light. In alternative embodiments, the light absorbing surfaces may be configured to reflect or diffuse a fraction of the incoming light, e.g. so that more than 10% of the incoming light is diffused back into the light guide 101 and so that less than 90% of the incoming light is absorbed.

The absorbers 130 may have a size relative to the masking elements 120 so that the absorbers only extend to a point where rays, such as ray 183, are transmitted through the back face, but does not extend to a point where rays, such as rays 184 are internally reflected. This extension can be determined by determining the off-set d from d=t×tan(ca) as explained above and as shown in FIG. 1. Thus, the area of the absorbing element 110 may be larger than the area of a masking element 120 according to the off-set d.

Thus, in order to absorb diffused light from the plurality of masking elements 120, a plurality of light absorbers 130 comprising first and second absorbers 131,132 may be arranged adjacent to the respective first and second light sources 111,112 to absorb at least a fraction of light diffused from the diffusing surfaces of the respective adjacent first and second masking elements 121,122. For example, the first and second light absorbers 131,132 may be arranged to at least partially surround the respective first and second light sources 111,112, e.g. the absorbers may be planar rings which surrounds the light sources. Thus, the first and second light absorbers 131, 132 may be arranged at the back side of the light guide oppositely to the respective first and second masking elements 121, 122 arranged at the front side of the light guide. For example, the light absorbers may be formed as a ring of a material which has good light absorbing properties such as black mat plastic foil, or a black matt printing on a part present in this area.

In order to reduce loss of light energy retro-reflectors may be used instead of absorbers 130. Retro-reflectors reflect light back along the same path (or substantially the same path) as it was received from. Thus, light may propagate back and forth as illustrated by rays 185, e.g. until light is diffused in other directions and possibly total internally reflected at the back face 102 or absorbed by other means. Since rays that are received from the masking elements 120 and reflected from the retro-reflectors generally will not be directly transmitted through the front face 103 no bright areas or rings will be visible through the front face 103. Accordingly, the retro-reflectors address the same problem as the absorbers 130 but enable a higher energy efficiency of the lighting device 100. The retro-reflectors are not illustrated in FIG. 1 but should have the same size as the absorbers 130 according to the off-set d. Accordingly, alternatively or additionally to using absorbers 130 a plurality of retro-reflectors comprising first and second retro-reflectors may be used so that the first and second retro-reflectors at least partially surround the respective first and second light sources 131,132 to reflect at least a fraction of light diffused from the diffusing surfaces of the respective opposite first and second masking elements 121,122 back to the respective opposite first and second masking elements 121,122.

In order to further improve the energy efficiency of the lighting device 100 light diffusing or reflective surfaces 140 which faces the back face 102 may be arranged next to the light retro-reflectors or absorbers 130 for diffusing or reflecting light transmitted through the back face back into the light guide. Accordingly, rays, such as ray 186, that are transmitted through the back face 102 may be reflected or diffused back into the light guide 101.

Any applied absorbers 130, retro-reflectors and diffusing or reflective surfaces 140 (except for reflective surfaces 140 which are fully specular reflective) should not be optically connected to the back face 102 in order not to affect the capability of the light guide 101 to provide total internal reflection of rays hitting the internal surfaces with an angle larger than the critical angle ca. Accordingly, any applied absorbers 130, retro-reflectors and diffusing or non-specular reflective surfaces 140 should be separated from the back face 102 by air or other transparent material with a low refractive index such as materials with a refractive index which is lower than 1.35, preferably lower than 1.1.

In order to couple light out of the light guide out coupling features 150 may be arranged at the surface of front face 103, and/or at the surface of the back face 102, or inside the light guide 101 for coupling light out through the front face 103 at non-masked locations where masking elements 120 are not present. The out coupling features may be made of discrete features like indents or printed dots on the front and/or back faces and/or particles made of transparent material with a different refractive index than the light guide material which are embedded in the light guide material. The out coupling features should scatter or diffuse the light without absorbing any significant amount of the light.

Figure 2:
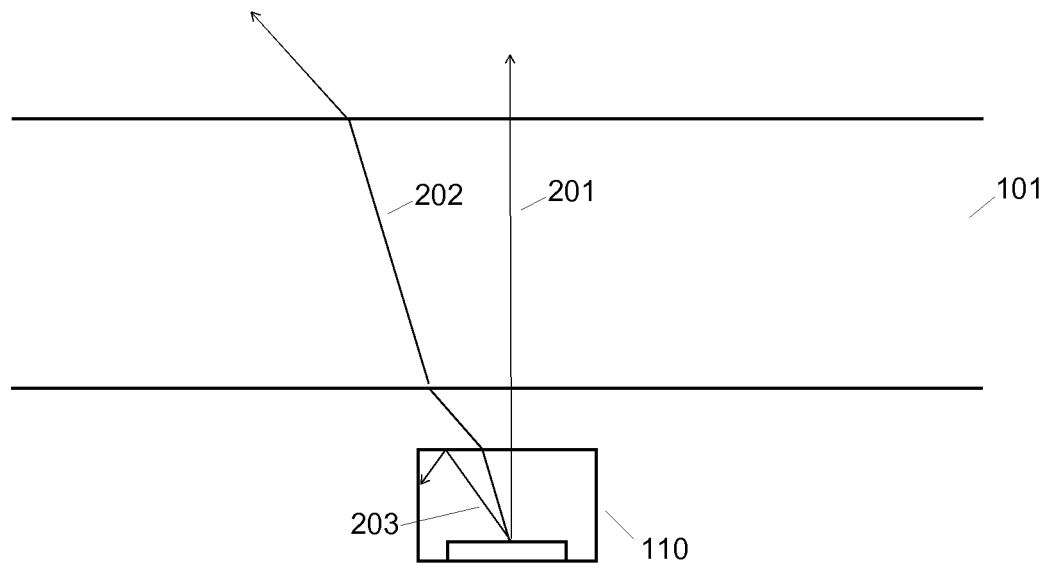
FIG. 2 illustrates the improvements in-coupling capabilities of a LED light source 110 achieved by connecting the light source to the light guide 101 by use of an interface layer 210.
Figure 2:
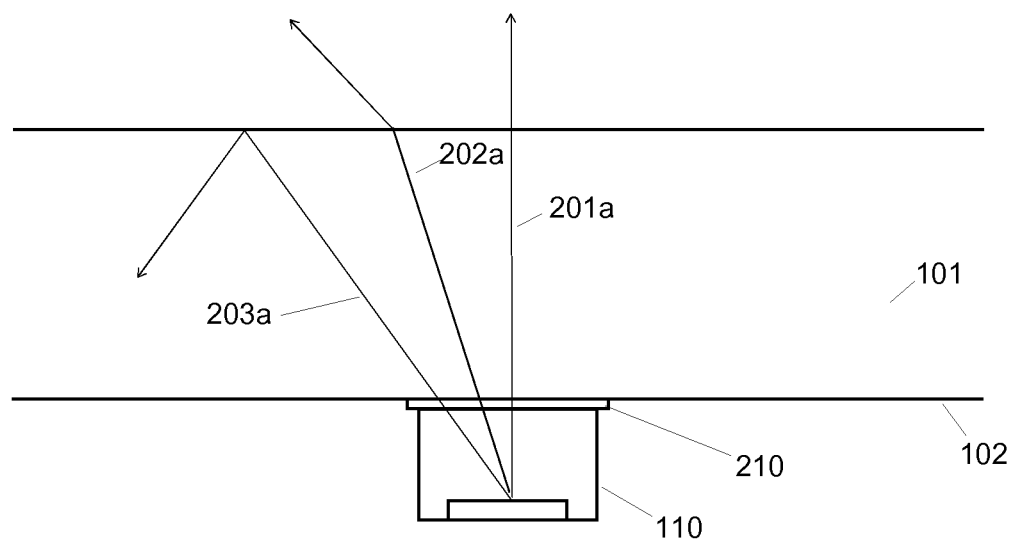

The light emitting faces of the light sources may be optically connected to the back face by arranging an interface layer 210 (see FIG. 2) of optical interface material between the light source and the back face. The optical interface layer is not air, but may be an adhesive having a refractive index larger than the refractive index of air, i.e. larger than one, preferably larger than 1.35. For example, the refractive index of the interface between the light sources and the back face 102 may be around 1.5 or close to the refractive index of the light guide material or close to the refractive index of the encapsulating material of the light source 110. Alternatively, the optical connection may be achieved by pressing a soft silicon encapsulation of the light sources 110 against the light guide 101. The optical connection enables a part of the light to enter the light guide at such angles (relative to the normal) which are large enough to establish total internal reflection without reflection by the masking elements, and so improving the percentage of the amount of light from the light sources which is coupled into the light guide. FIG. 2 illustrates why the optical connection improves the in-coupling of light. In the upper illustration in FIG. 2 rays 201 and 202 are transmitted through the light guide without total internal reflection and can only enter the light guide again via diffusing surfaces of the masking elements. The ray 203 is total internal reflected within the encapsulation of the light source and may therefore not be transmitted into the light guide 101. In the lower illustration an interface layer 210 of a solid material such as transparent adhesive is provided between the light emitting surface of the light source 110 and the back face of the light guide. The rays 201a-203a are equivalent to the rays 201-203 with respect to the initial propagation direction within the light source encapsulation. Since the refractive index of the interface layer 210 is comparable to the refractive index of the encapsulation of the light source and the light guide, the ray 203a may not be internally reflected within the light source but may enter the light guide 101 and become internally reflected within light guide, or transmitted through the light guide. Accordingly, the interface layer 210 may improve the in-coupling of light from the light sources 110.

The masking elements may be made in various ways. For example, the masking elements may be made by printing dots of ink onto the front and/or back surfaces of transparent foils (which can be applied to the front face 102) or directly on the front face 103 of the light guide and covering the printed dots with a metal sheet provided with a hole pattern to establish a certain transparency of the metal film. The mask could be made of a white reflective plastic foil, connected to the front face 103 and with a metal layer on top of it. Holes in the metal layer should preferably not penetrate the white reflective plastic foil.

The masking elements 120 could be printed with a dot/hole pattern in one layer using a diffuse reflective and transparent material to provide diffusion and transmitting capability in a single layer. The masking elements 120 could also be realized by a printed layer or multiple layers so that a thickness gradient is formed that is matched with the required translucency.

The reflection of the mask can be adapted in such a way that less light is reflected to the absorber, and more light is coupled into the light guide for becoming internally reflected. This may be achieved by replacing the white diffusing layer by a mirror with a Fresnel structure, nano-structures and/or holographic structures.

In order to obtain a uniform intensity of light emitted from the lighting device 101 towards the matrix of image forming transparent pixels 198 the light out coupling capability of the out coupling features 150 and a transparency of the masking elements 120 should be adjusted so as to equalize the light intensity of light coupled out by the out coupling features and the light transmitted by the masking elements. This adjustment may be achieved by determining the number, size, or density of out coupling features 150 and the transparency of the masking elements 120. With this adjustment, the effect of the optical stack has to be taken into account.

The first and second light sources 111,112 may be mechanically connected with the respective first and second light absorbers 131,132 (e.g. by gluing) and faces of the absorbers may be fixed to the back face 102 by a transparent adhesive. The fixation of the light sources to the absorbers may provide an advantageous way of fixing the light sources to the light guide by gluing the absorbers onto the light guide. In order not so severely affect the total internal reflection capabilities of the light guide 101, the absorbers should be glued to the back face 102 by use of an adhesive having a low refractive index, preferably lower than 1.35.

To provide a stronger fixation of the assembly of light sources and absorbers, also the light sources may be fixed to the back face by a transparent adhesive. The part of the fixation of the light source that has the function of interface layer 210 and which has to transmit light should have a relative high refractive index, preferably higher than 1.35, in order to provide good in-coupling of the light from the light sources 110. Accordingly, the refractive index of the adhesive that has the function of interface layer 210 should preferably be greater than the refractive index of the adhesive for fixation of the absorbers.

According to the design of the lighting device as described here, the light guide 101 may be formed as a plate with uniform thickness and smooth surfaces. No holes are required for the light sources 110 to be inserted into. Possibly, small irregularities such as small indents may be made on one or more surfaces for providing out-coupling capabilities.

Whereas a lighting device 100 for use in displays 199 has been described, the lighting device 100 may also be used for other applications including general lighting applications. Accordingly, the light source 100 included a plurality of light sources 110 and corresponding pluralities of masking elements 120 and absorbers 130 may be used for lighting applications. However, for lighting applications the lighting device 100 could also be configured with only one light source 110, only one masking element 120 arranged opposite to the light source, and only one absorber 130 or retro-reflector arranged so that it at least partially surrounds the light source 110. Whether the lighting device is configured with a plurality of light sources 110 or a single light source 110 the function of the lighting device is the same.

While various embodiments have been illustrated and described in detail in the drawings and foregoing description, such illustration and description are to be considered illustrative or exemplary and not restrictive; a light device is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A lighting device, comprising:
    one or more planar light guides, wherein each of the one of more planar light guides includes a respective back face for receiving light and a respective front face for emitting light,
    one or more light sources arranged to transmit light into the respective back face of the one or more planar light guides,
    one or more semi-transparent masking elements, wherein each of the one or more semi-transparent masking elements having a respective light diffusing surface arranged to partially diffuse light back into the one or more light guides and partially transmit light through a respective semi-transparent masking element so as to mask the one or more light sources, and
    one or more light absorbers arranged adjacent to the one or more light sources to absorb at least a fraction of light diffused from the respective diffusing surface of the one or more semi-transparent masking elements, or one or more retro-reflectors arranged adjacent to the one or more light sources to reflect at least a fraction of light diffused from the respective diffusing surface of the one or more semi-transparent masking elements back to an adjacent one of the one or more semi-transparent masking elements back to an adjacent one of the one or more semi-transparent masking elements, wherein the one or more light absorbers or the one or more retro-reflectors are not optically connected to the one or more planar light guides.

2. A lighting device according to claim 1, wherein the one or more light absorbers or the one or more retro-reflectors are separated from the one or more light guides by air or by a transparent material with a low refractive index.

3. A lighting device according to claim 2, wherein the one or more light sources are connected to the one or more light guides by a transparent adhesive having a refractive index that is higher than the refractive index of a transparent adhesive connecting the one or more light absorbers or the one or more retro-reflectors.

4. A lighting device according to claim 1, further comprising out coupling features arranged at a surface of the front face, or a surface of the back face of the one or more light guides, or inside the one or more light guides for coupling light out through the front face at non-masked locations wherein the one or more semi-transparent masking element is not present.

5. A lighting device according to claim 4, wherein the light out coupling capability of the out coupling features and a transparency of the one or more semi-transparent masking elements is configured to equalize light intensity of light coupled out by the out coupling features and light transmitted by the one or more semi-transparent masking elements.

6. A lighting device according to claim 1, wherein the one or more light sources are mechanically connected to the one or more light absorbers or the one or more retro-reflectors and wherein the one or more light absorbers, the one or more retro-reflectors, and/or the one or more light sources are fixed to the back face.

7. A lighting device according to claim 1, further comprising a light diffusing or reflective surface facing the back face of the one or more light guides and arranged next to the one or more light absorbers or, the one or more retro-reflectors, for diffusing or reflecting light transmitted through the back face back into the one or more light guides.

8. A method for illuminating a matrix of image forming transparent pixels of a display, the method comprises providing a lighting device which comprises
    a planar light guide with a back face for receiving light and a front face for emitting light,
    first and second light sources arranged to transmit light into the back face of the light guide, wherein the first and second light sources are connected to the planar light guide by a transparent adhesive having a refractive index that is higher than the refractive index of a transparent adhesive connecting the first and second light absorbers or the first and second retro-reflectors,
    first and second semi-transparent masking elements having light diffusing surfaces, where the masking elements are arranged to partially diffuse light back into the light guide and partially transmit light through the masking elements so as to mask the respective first and second light sources, and
    first and second absorbers arranged adjacent to the respective first and second light sources to absorb at least a fraction of light diffused from the diffusing surfaces of the respective first and second masking elements, or first and second retro-reflectors arranged adjacent to the respective first and second light sources to reflect at least a fraction of light diffused from the diffusing surfaces of the respective first and second masking elements back to the respective first and second masking elements, the method further comprises, arranging the matrix of image forming transparent pixels in front of the plate shaped light guide.

9. A method according to claim 8, further comprising out coupling features arranged at a surface of the front face, a surface of the back face of the planar light guide, or inside the planar light guide for coupling light out through the front face at non-masked locations wherein the first and second semitransparent masking element is not present.

10. A method according to claim 9, wherein the light out coupling capability of the out coupling features and a transparency of the first and second semi-transparent masking elements is configured to equalize light intensity of light coupled out by the out coupling features and light transmitted by the first and second semi-transparent masking elements.

11. A method according to claim 9, wherein the one or more light absorbers or the one or more retro-reflectors are separated from the one or more light guides by air or by a transparent material with a low refractive index.

12. A method according to claim 8, wherein the first and second light sources are mechanically connected to the first and second light absorbers or the first and second retro-reflectors, and wherein the first and second light absorbers, the first and second retro-reflectors, and/or the first and second light sources are fixed to the back face.

13. A method according to claim 8, further comprising:
providing a light diffusing or reflective surface facing the back face of the planar light guide and arranged next to the first and second light absorbers or the first and second retro-reflectors, for diffusing or reflecting light transmitted through the back face back into the planar light guide.

14. A display for showing images, comprising:
a matrix of image forming transparent pixels; and
a lighting device arranged such that a front face of the lighting device faces a face of the matrix of image forming transparent pixels, wherein the lighting device comprises:
one or more planar light guides, wherein each of the one or more planar light guides includes a respective back face for receiving light and a respective front face for emitting light;
one or more light sources arranged to transmit light into the respective back face of the one or more planar light guides;
one or more semi-transparent masking elements, wherein each of the one or more semi-transparent masking elements having a respective light diffusing surface arranged to partially diffuse light back into the one or more light guides and partially transmit light through a respective semi-transparent masking element so as to mask the one or more light sources; and
one or more light absorbers arranged adjacent to the one or more light sources to absorb at least a fraction of light diffused from the respective diffusing surface of the one or more semi-transparent masking elements, or one or more retro-reflectors arranged adjacent to the one or more light sources to reflect at least a fraction of light diffused from the respective diffusing surface of the one or more semi-transparent masking elements back to an adjacent one of the one or more semi-transparent masking elements, wherein the one or more light absorbers or the one or more retro-reflectors are not optically connected to the one or more planar light guides and wherein the one or more light absorbers or the one or more retro-reflectors are separated from the one or more light guides by air or by a transparent material with a low refractive index.

15. A display according to claim 14, wherein the one or more light sources are connected to the one or more light guides by a transparent adhesive having a refractive index that is higher than the refractive index of a transparent adhesive connecting the one or more light absorbers or the one or more retro-reflectors.

16. A display according to claim 14, further comprising out coupling features-arranged at a surface of the front face, a surface of the back face of the one or more light guides, or inside the one or more light guides for coupling light out through the front face at non-masked locations wherein the one or more semi-transparent masking element is not present.

17. A display according to claim 14, wherein the one or more light sources are mechanically connected to the one or more light absorbers or the one or more retro-reflectors, and wherein the one or more light absorbers, the one or more retro-reflectors, and/or the one or more light sources are fixed to the back face.

18. A display according to claim 16, wherein the light out coupling capability of the out coupling features and a transparency of the one or more semi-transparent masking elements is configured to equalize light intensity of light coupled out by the out coupling features and light transmitted by the one or more semitransparent masking elements.

19. A display according to claim 14, further comprising a light diffusing or reflective surface facing the back face of the one or more light guides and arranged next to the one or more light absorbers or the one or more retro-reflectors, for diffusing or reflecting light transmitted through the back face back into the one or more light guides.

* * * * *